US008662471B2

(12) United States Patent
Ohmi et al.

(10) Patent No.: US 8,662,471 B2
(45) Date of Patent: Mar. 4, 2014

(54) SOLENOID VALVE

(75) Inventors: Tadahiro Ohmi, Sendai (JP); Kouji Nishino, Osaka (JP); Tsuyoshi Tanigawa, Osaka (JP); Michio Yamaji, Osaka (JP); Nobukazu Ikeda, Osaka (JP); Ryousuke Dohi, Osaka (JP)

(73) Assignees: Fujikin Incorporated, Osaka (JP); National University Corporation Tohoku University, Miyagi (JP)

( * ) Notice: Subject to any disclaimer, the term of this patent is extended or adjusted under 35 U.S.C. 154(b) by 555 days.

(21) Appl. No.: 12/935,119

(22) PCT Filed: Mar. 26, 2009

(86) PCT No.: PCT/JP2009/001353
§ 371 (c)(1),
(2), (4) Date: Dec. 8, 2010

(87) PCT Pub. No.: WO2009/122683
PCT Pub. Date: Oct. 8, 2009

(65) Prior Publication Data
US 2011/0121217 A1    May 26, 2011

(30) Foreign Application Priority Data
Mar. 31, 2008 (JP) ................................. 2008-090828

(51) Int. Cl.
*F16K 31/02* (2006.01)
(52) U.S. Cl.
USPC .................................................. 251/129.15
(58) Field of Classification Search
USPC ................... 137/624.11; 251/129.15
See application file for complete search history.

(56) References Cited

U.S. PATENT DOCUMENTS

| 4,124,192 A * | 11/1978 | White ....................... 251/129.15 |
| 2002/0084435 A1* | 7/2002 | Fukano et al. ........... 251/129.17 |
| 2009/0059474 A1* | 3/2009 | Zhamu et al. ................. 361/503 |
| 2009/0140186 A1* | 6/2009 | Kunz et al. ................. 251/129.2 |

FOREIGN PATENT DOCUMENTS

| JP | 63297883 A * | 12/1988 |
| JP | H04-501200 | 2/1992 |
| JP | U1992-87356 | 7/1992 |
| JP | 2000-240838 | 9/2000 |
| JP | 2004-108532 | 4/2004 |
| JP | 206-104993 | 4/2006 |
| WO | WO9004871 | 3/1990 |

* cited by examiner

*Primary Examiner* — John K Fristoe, Jr.
*Assistant Examiner* — R.K. Arundale
(74) *Attorney, Agent, or Firm* — Antonelli, Terry, Stout & Kraus, LLP.

(57) ABSTRACT

There is provided a solenoid valve that realizes space-saving by reducing the size of a dedicated driving power source. There is provided a solenoid valve capable of instantaneously opening and closing that includes an electric double layer capacitor having a low direct current internal resistance and a low equivalent series resistance as a motive power supply. The electric double layer capacitor has single-cell electrical properties including a capacitance of 1 to 5 F, a rated voltage of 21 to 2.7 V, a direct current internal resistance of 0.01 to 0.1Ω, and an equivalent series resistance at 1 KHz of 0.03 to 0.09Ω, and includes a polarizable electrode made of glassy carbon having a specific surface area of 1 to 500 m$^2$/g.

6 Claims, 9 Drawing Sheets

SOLENOID VALVE

TECHNICAL FIELD

The present invention relates to a solenoid valve.

BACKGROUND ART

Conventionally, valves that are used, in particular, in semiconductor manufacturing apparatuses have been required to be compact and capable of high-speed opening and closing. In order to meet such requirement, for example, solenoid valves including a solenoid with a reduced size, as shown in FIG. 5 to FIG. 7, have been proposed (Patent Document 1).

FIG. 5 is a longitudinal cross-sectional view showing a solenoid valve of normally closed type, and FIG. 7 is a longitudinal cross-sectional view showing a solenoid valve of normally open type. FIG. 6 is a cross-sectional view showing, in enlargement, the solenoid portion of the solenoid valve shown in FIG. 5. A metallic diaphragm 5 is provided above a valve seat 2 formed on the bottom face of a valve chest 1a. The peripheral edge of the metallic diaphragm 5 is held sandwiched between a bonnet 3 inserted into the valve chest 1a and a valve body 1 in an airtight manner. A stem 7 is actuated using an electromagnet M fixed to the valve body 1, and the metallic diaphragm 5 is seated or unseated on or from the valve seat 2 against the elastic reaction force (about 17 kgf) of a spring 8. The electromagnet M has a tubular plunger 19, a tubular yoke 18 surrounding the plunger 19, a coil 17 provided inside the yoke 18, and a movable iron core 20 that is provided facing an end face of the yoke 18 with a gap G in between and that is screwed to the plunger 19.

The yoke 18 is formed as a double cylinder made up of a short first yoke portion 18c located on the inner side and a tall second yoke portion 18d located on the outer side. The coil 17 is provided between the first yoke portion 18c and the second yoke portion 18d. An end of the coil 17 on the movable iron core side is located near an end face 18d' of the tall second yoke portion 18d on the movable iron core side. The movable iron core 20 is formed of a tubular first movable iron core portion 20c having a wall thickness that is the same as the thickness of the first yoke portion 18c and a flange-shaped second movable iron core portion 20d. The end face 18c' of the first yoke portion 18c and the end face 20c' of the first movable iron core portion 20c, as well as the end face 18d' of the second yoke portion 18d and the end face 20d' of the second movable iron core portion 20d faced one another such that there is a gap G of about 0.4 mm therebetween and that the gap G between the end face 18c' of the first yoke portion 18c and the end face 20c' of the first movable iron core portion 20c is located closer to the first yoke portion 18c by a distance S from the movable iron core-side end of the coil 17 even when the electromagnet M is not in operation. A shaft 21 coupled to the stem 7 and the plunger 19 are coupled together by means of an adjust screw 15. The adjust screw 15 enables fine adjustment of the gap G between the yoke 18 and the movable iron core 20 fixed to the plunger 19.

The actuator body 9 is formed of aluminum in a cylinder shape, is fixed to the upper end of the bonnet 3 by a fixing nut 13, and is prevented from rotating using a set screw 14. A solenoid base 12 is fixed by being screwed in the upper portion inside the actuator body 9, and the electromagnet M made up of the coil 17, the yoke 18, the plunger 19, the movable iron core 20, and so forth is fixed to the solenoid base 12 by a set screw 16. The upper portion of the actuator body 9 is sealed by an actuator cap 10 made of aluminum, and a lead wire 22 for supplying an excitation current is guided to the outside through a lead protector 23 provided at the cap 10.

For the solenoid valve 30A shown in FIG. 5, when the coil 17 is de-energized, a disc 6 presses against the metallic diaphragm 5 by the spring 8 depressing the flange portion of the stem 7, and the metallic diaphragm 5 is caused to be seated on the valve seat 2 against its elasticity, and thereby a flow passage 1b is closed. At this time, the movable iron core 20 coupled via the stem 7, the shaft 21, and the plunger 19 is also pulled down by an amount corresponding to the solenoid stroke gap G. Upon energizing the coil 17, the movable iron core 20 is lifted up by an amount corresponding to the solenoid stroke gap G against the elastic force of the spring 8 (about 17 kgf), so that the shaft 21 threadedly coupled via the movable iron core 20 and the plunger 19 is pulled up, and by pulling up the stem 7 integrated with the shaft 21 and the disc 6 fixed to the stem 7, the metallic diaphragm 5 curves upward by its elasticity so as to move away from the valve seat 2, causing the flow passage 1b to open. Note that a solenoid valve 30B as shown in FIG. 7 is a solenoid valve obtained by changing the solenoid valve 30A in FIG. 5 in design into a normally open type.

For these solenoid valves, it is necessary to control the current so that the valves are opened or closed by instantaneously passing a relatively large current through the coil upon starting the fast opening or closing operation to attract the movable iron core 20 and lift it up by an amount corresponding to the gap G, and, after the movable iron core 20 has been attracted, the open or close state of the valves is maintained by passing a relatively small current necessary for holding the movable iron core 20 in the attracted state. For this reason, as shown in FIG. 8, the actuation of the solenoid valve 30A (B) is controlled by connecting a large-capacity, high-voltage aluminum electrolytic capacitor and a dedicated power source 50 including a charge/discharge control circuit for the capacitor to the solenoid valve 30A (B) via a cable 51.

FIG. 9 is a block diagram showing the circuit configuration of a conventional dedicated power source, and FIG. 10 is a timing diagram showing the output waveform of the dedicated power source in a solenoid valve of normally closed type. In FIG. 9, reference numeral 52 denotes an input terminal that receives a supplied power of AC 100 V to 240 V, 53 denotes an AC/DC converter, 53a denotes a high-voltage line of DC 48 V, 53b denotes a low-voltage line of DC 3 V, 54 denotes an electrolytic capacitor with a rated voltage of 100 V and a capacitance of 4700 μF, 55 denotes a switching circuit, 56 denotes a timing circuit that switches the switching circuit 55, 57 denotes a common line, and 58 denotes an input terminal for opening or closing signals.

A solenoid 32 has a diameter of 23.6 mm and a height of 25 mm, with a weight of 70 g, the ferromagnetic material such as the movable iron core is made of 35 wt % of cobalt and 65 wt % of iron, the number of turns in the coil 17 is 315, and the resistance value of the coil 17 is 5.6Ω (20° C.). The solenoid 32 exerts an attraction force of 25 kgf at about 5.0 A when the gap G is 0.4 mm, and exerts an attraction force of about 25 kgf at 0.4 A when the gap G is 0 (when attracting).

When an opening or closing signal indicating ON (valve open) is input to the dedicated power source, the timing circuit 56 connects the switching circuit 55 to the line 53a to pass a drive current having a relatively large current value (about 4.8 A) through the solenoid 32, thus opening the closed valve. After a certain time period (e.g., about 5 ms), the timing circuit 56 switches the switching circuit 55 from the line 53a to the line 53b to pass a drive current having a relatively small current value (e.g., 0.4 to 0.55 A) through the solenoid 32 in order to maintain the open state of the valve. Patent document 1: JP 2000-240838 A

DISCLOSURE OF INVENTION

Problem to be Solved by the Invention

However, as described above, since a relatively large current needs to be instantaneously passed through the exciting coil at the time of starting in order to drive the solenoid valve so as to rapidly open or close, it is necessary to contain a large-capacity, high-voltage aluminum electrolytic capacitor in the dedicated power source. Large-capacity, high-voltage aluminum electrolytic capacitors that are required for high-speed starting of solenoid valves are only available in large size and thus cannot be integrated with solenoid valves, and therefore a dedicated power source equipped with an aluminum electrolytic capacitor needs to be used separately. For example, for a solenoid valve having a height of 93 mm and a width of 52 mm, the smallest possible size of a dedicated external power source that contains a large-capacity, high-voltage aluminum electrolytic capacitor and that actuates eight solenoid valves is a width of 102 mm, a height of 161 mm, and a depth of 161 mm, Furthermore, although a significant distance is generated between the dedicated external power source and the solenoid valves depending on the positional relationship, a high current of about 5 A is passed through the distribution cable 51 that connects the dedicated external power source and the solenoid valves, and the wire resistance increases as a function of the wire distance, and therefore there is also a problem in that it is necessary to select a dedicated wire capable of satisfying the operating conditions within the required range of wire distance, resulting in an increased wiring cost.

Therefore, it is a main object of the present invention to reduce the size of a dedicated power source that actuates a solenoid valve, thereby realizing space saving. It is also an object of the invention to decrease the wire resistance by containing a dedicated power source with a reduced size in a solenoid valve, thereby reducing the costs.

Means for Solving Problem

The present invention is characterized by instantaneously passing a large current using an electric double layer capacitor using a special activated carbon and having a very low internal resistance, thus instantaneously effecting opening or closing of the solenoid valve in order to solve the above-described problems.

The present invention is characterized in that the electric double layer capacitor is mounted to a solenoid valve as a motive power supply. Preferably, the electric double layer capacitor serving as a motive power supply is built into the solenoid valve.

Preferably, the electric double layer capacitor used for the present invention uses activated carbon obtained by using phenolic or furfural resin as a starting material as a polarizable electrode, and the activated carbon is preferably glassy carbon.

Preferably, the glassy carbon (also referred to as "aerogel carbon") used as the polarizable electrode has a specific surface area of 1 to 500 m$^2$/g.

Preferably, a motive power supply used in the present invention is a unit of electric double layer capacitors that have single-cell electrical properties including a capacitance of 1 to 5 F, a rated voltage of 2.1 to 2.7 V, a direct current internal resistance of 0.01 to 0.1Ω, and an equivalent series resistance (ESR) at 1 KHz of 0.03 to 0.09Ω and that are connected in parallel, connected in series, or connected by a combination of parallel and serial connections.

The opening or closing time period of a solenoid valve according to the present invention, that is, a time period between input of a signal for opening or closing the solenoid valve and completion of the opening or closing operation is preferably 10 ms or less.

Furthermore, in order to attain the above-described object, the present invention provides a solenoid valve including: a valve body including a flow passage, a valve member that opens and closes the flow passage, a valve seat on or from which the valve member can be seated or unseated, a stem that operates opening/closing of the valve member, and a spring that biases the stem; a solenoid that is connected with the valve body and that actuates the stem; a motive power supply that is a unit including a charging power supply for supplying a driving electric power to the solenoid with an electric double layer capacitor, and a control circuit that controls the driving electric power supplied from the charging power supply to the solenoid in accordance with an external command; and a casing that is attached integrally to the valve body and that houses the motive power supply.

Furthermore, in order to attain the above-described object, the present invention provides a solenoid valve that electromagnetically actuates a valve, wherein an electric double layer capacitor is used for supplying a drive current to a solenoid for electromagnetic actuation, and the capacitor is housed therein integrally with the valve and the solenoid.

Effects of the Invention

The solenoid valve according to the present invention can reduce the size of a dedicated power source by using a charging power supply formed by an electric double layer capacitor as a main power source for actuating a solenoid. That is, an electric double layer capacitor has a very large capacitance per unit area as compared with an aluminum electrolytic capacitor, and therefore can be configured in a smaller size for the same capacitance.

By appropriately placing such an electric double layer capacitor, the electric double layer capacitor can be housed, together with a drive control circuit, in a casing attached to the valve body. Accordingly, a conventionally used separate dedicated power source will not be required, and therefore it is possible to realize further space-saving.

Furthermore, by housing and the motive power supply in a casing attached integrally with the valve body and thus containing the motive power supply therein, it is possible to shorten the wiring between the motive power supply and the solenoid coil. Since the value of current flowing through the solenoid coil is increased by an amount by which the wire resistance is reduced, it is also possible to reduce the size of the solenoid, which in turn enables a size reduction of the solenoid valve.

EXPLANATION OF REFERENCE NUMERALS

Figure 1:
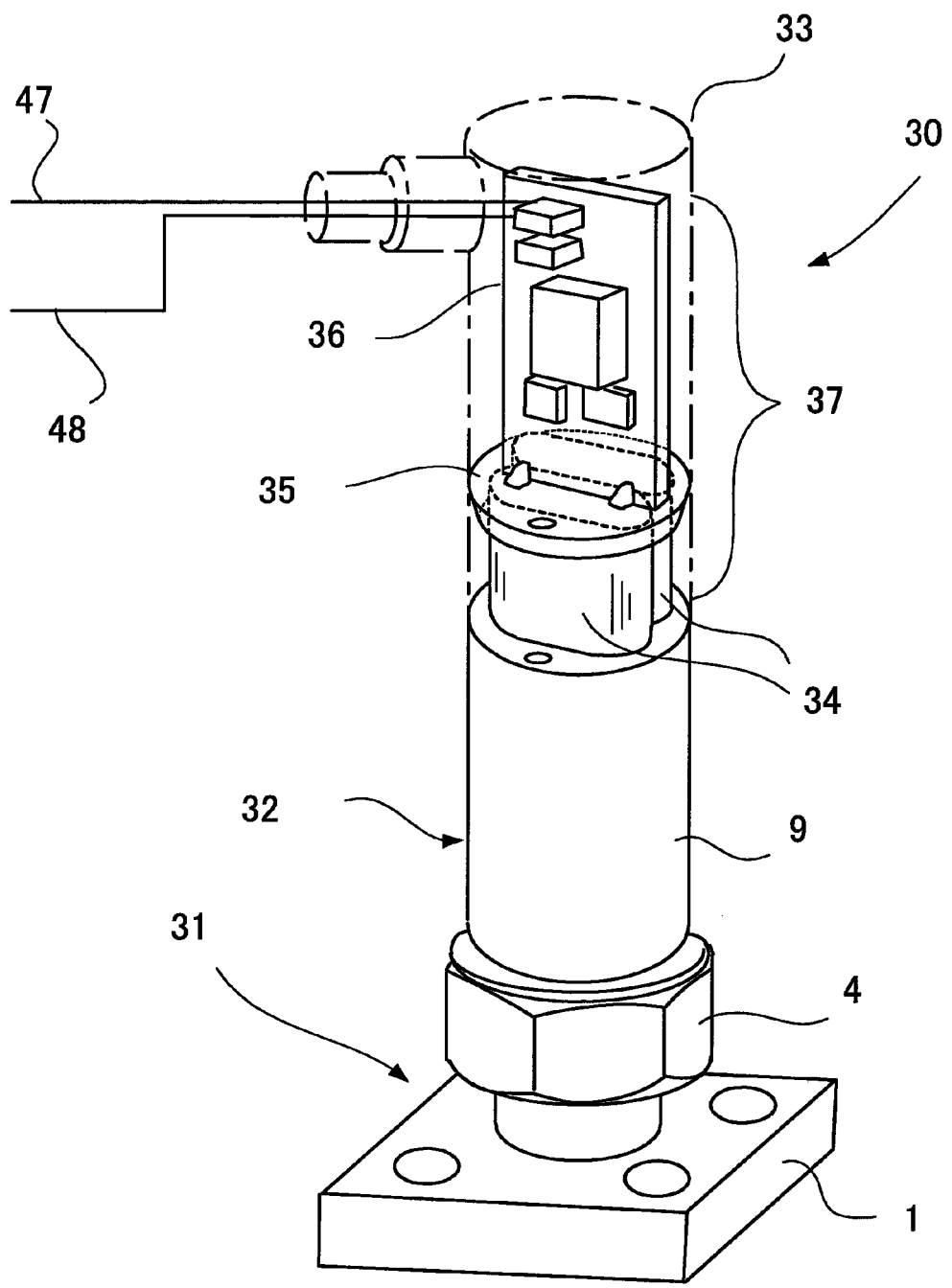
FIG. 1 is a perspective view showing a first embodiment of the solenoid valve according to the present invention.

30 Solenoid valve
31 Valve body
32 Solenoid
33 Casing
34 Electric double layer capacitor
37 Motive power supply

PREFERRED EMBODIMENTS OF THE INVENTION

Embodiments of the solenoid valve according to the present invention will be described below with reference to the drawings. Note that throughout all the drawings and all the embodiments, the same or similar components are denoted by the same reference numerals, and any redundant description thereof may be omitted.

FIG. 1 is a perspective view showing a first embodiment of the solenoid valve according to the present invention. In the present invention, the conventional configuration shown in FIGS. 5 to 7 may be used for a valve body 31 and a solenoid 32 attached to the valve body 31. Therefore, in the following description, the detailed description with reference to the drawings is omitted for components of the valve body 31 and the solenoid 32 that are identical with or similar to those in FIGS. 5 to 7, using the reference numerals used for FIGS. 5 to 7. Note that the valve body 31 shown in FIG. 1 includes the flow passage 1b, the diaphragm 5 serving as a valve or valve member, the valve seat 2, the stem 7, and spring 8 that are contained in the valve body 1 in FIGS. 5 and 7, and the solenoid 32 is an actuating portion (actuator) including the actuator body 9, the solenoid base 12, the adjust screw 15, the set screw 16, the coil 17, a coil bobbin 17a, the yoke 18, the plunger 19, and the movable iron core 20 in FIGS. 5 and 7.

A casing 33 indicated by phantom lines in FIG. 1 is connected with the solenoid valve 30 such that it is integrated with the valve body 31. The casing 33 is integrated with the valve body 31 by being fixed to the actuator body 9 by a fixing means such as a set screw. In the example shown in FIG. 1, the casing 33 is attached onto the actuator body 9, in place of the actuator cap 10 of the conventional example shown in FIG. 5, and is screwed to the solenoid base 12 (see FIG. 5) by a screw (not shown) as with the actuator cap 10 in FIG. 5.

Figure 5:
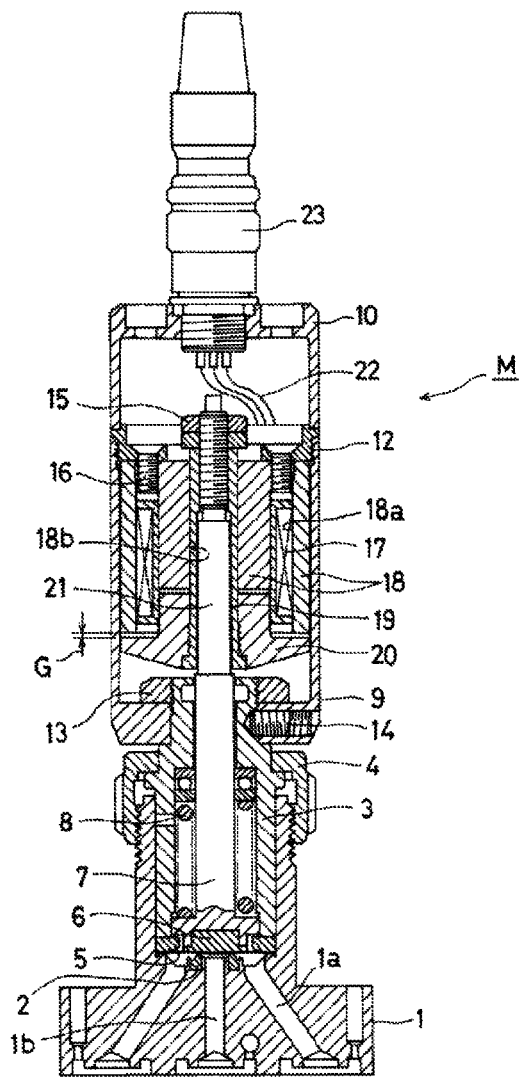
FIG. 5 is a central longitudinal cross-sectional view showing a conventional solenoid valve of normally closed type.

The casing 33 can take various forms without being limited to the illustrated example, and may be integrally attached with the valve body 31 by a suitable means; for example, it may be coupled to the actuator cap 10 of the conventional example shown in FIG. 5 by a fixing means such as a set screw, or may be configured to be directly fixed to the valve body 1.

A plurality of (two in the illustrated example) electric double layer capacitors 34 in the form of elongated cylinders are provided above the solenoid 32 in the casing 33. Electrode terminals (not shown) of the electric double layer capacitors 34 are soldered to a substantially disc-shaped first printed wiring board 35.

The first printed wiring board 35 may have an arc-shaped outer circumferential face having a diameter slightly smaller than the inner diameter of the casing 33, and can be housed in the casing 33 without rattling due to the presence of the outer circumferential face. The first printed wiring board 35 may be provided with an O-ring (not shown) around its perimeter so that it can be press-fitted into the casing 33. Alternatively, the first printed wiring board 35 may be supported on the solenoid 32 via a supporting member (not shown).

The electric double layer capacitors 34 are arranged so that they do not protrude from the circular top face of the solenoid 32.

A second printed wiring board 36 is disposed standing on the surface of the first printed wiring board 35 that is opposite the surface on which the electric double layer capacitors 34 are mounted (the upper surface in FIG. 1). A plurality of electronic components constituting a control circuit 39 (see FIG. 2) that controls discharging of the charging power supply made up of the electric double layer capacitors 34 are mounted on the second printed wiring board 36. The control circuit on the second printed wiring board 36 is connected to the electric double layer capacitors 34 via electrical wiring.

Preferably, the second printed wiring board 36 can be fixed to the first printed wiring board 35 by a suitable means such as solder and clips, thus forming a motive power supply 37 that is formed as a unit as a hybrid integrated circuit substrate in a three-dimensional configuration. The motive power supply 37 configured in this manner is housed in the casing 33 as a power source unit, and is attached to the solenoid 32 so as to be integrated with the valve body 31, thus forming a solenoid valve containing the motive power supply.

The second printed wiring board 36 has a quadrangular shape, and its width dimension is slightly smaller than the inner diameter of the casing 33, so that it cannot be easily rattled when housed in the casing 33. Note that in order to prevent rattling of the second printed wiring board 36, guide portions (not shown) such as guide grooves for guiding the two lateral edges of the second printed wiring board 36 may be formed on the inner surface of the casing 33.

The circuit configuration of the motive power supply 37 will be described with reference to the block diagram shown in FIG. 2. The motive power supply 37 includes a first discharge line 40 connected to a charging power supply 34X made up of the electric double layer capacitors 34, a second discharge line 41 connected to the charging power supply 34X, a step-down converter 42 disposed in the second discharge line 41, a common line 43 connecting the charging power supply 34X and the solenoid 32, a switching circuit 44 that switches between the first discharge line 40 and the second discharge line 41 to supply electric power to the solenoid 32, and a timing circuit 45 that controls the switching operation of the switching circuit 44 in accordance with an operation signal input from an external controller. The charging power supply 34X receives supply of electric power from a power supply cable 47. The timing circuit 45 receives input of a valve opening or closing signal from a controller (not shown) via an external signal input cable 48.

The electric double layer capacitors 34 used for the charging power supply 34X are electric double layer capacitors using a special activated carbon and having a very low direct current internal resistance, and a large current can be caused to flow instantaneously using these electric double layer capacitors, thus instantaneously effecting the opening or closing of the solenoid valve.

The electric double layer capacitors used for the charging power supply 34X are electric double layer capacitors that use glassy carbon obtained by using phenolic or furfural resin as a starting material as a polarizable electrode.

Furthermore, the glassy carbon (also referred to as "aerogel carbon") used as the polarizable electrode has a specific surface area of 1 to 500 $m^2/g$. The reason for this is that a specific surface of less than 1 $m^2/g$ cannot provide the required capacitance, whereas a specific surface area exceeding 500 $m^2/g$ causes an increase in the resistance, making it impossible to supply the starting current required for the initial actuation of the solenoid within the range of a rated voltage to the solenoid. Although commercially available electric double layer capacitors use activated carbon having a high specific surface area of 1600 to 2300 $m^2/g$ as the polarizable electrode in order to secure the capacitance, such activated carbon has a large resistance, and cannot be applied to the object of the present invention.

Although phenolic or furfural resin is ordinarily used in the form of steam-activated or alkali-activated carbon when used as an electrode material for batteries or the like, the present invention uses activated carbon obtained by $CO_2$-activating phenolic resin or furfural resin as the polarizable electrode of the electric double layer capacitors. The reason for this is that although $CO_2$-activated resin is expensive, it does not require washing with water after activation and will not cause the entry of impurities contained in the activator into the activated carbon, thus achieving high performance.

Specifically, phenolic resin or furfural resin is activated in a reactor in a $CO_2$ atmosphere at 800 to 1200° C. Since the specific surface area of the resulting activated carbon changes in accordance with the activation time in the reactor, the activation time is determined by the required specific surface area.

As the electric double layer capacitors of the motive power supply, electric double layer capacitors having single-cell electrical properties including a capacitance of 1 to 5 F, a rated voltage of 2.1 to 2.7 V, a direct current internal resistance of 0.01 to 0.1Ω, and an equivalent series resistance (ESR) at 1 kHz of 0.03 to 0.09Ω are used. Note that the direct current internal resistance can be measured by the measurement method prescribed in the Electronic Industries Association of Japan Standard "EIAJ RC-2377". Further, the equivalent series resistance can be measured using a milliohm meter.

Figure 2:
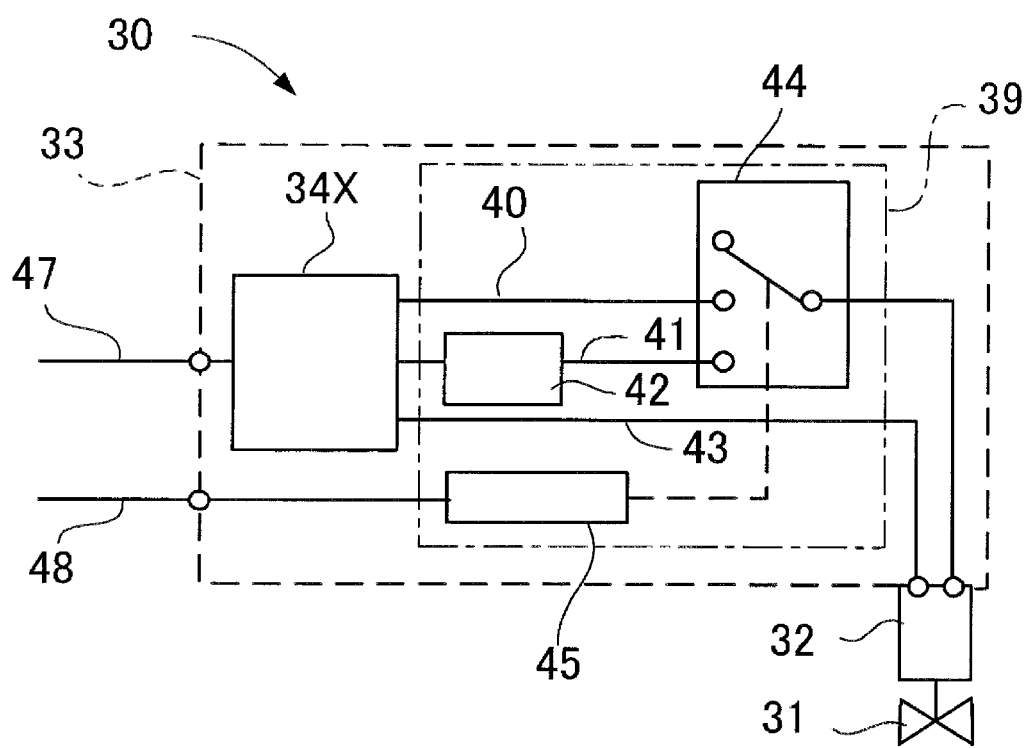
FIG. 2 is a block diagram showing the circuit configuration of a motive power supply built into the solenoid valve in FIG. 1.

In the example shown in FIG. 2, DC 9 V is supplied to the power supply cable 47. The charging power supply 34X is formed by connecting in series two electric double layer capacitors 34 having a rated voltage of 2.5 V, a rated capacitance of 1.5 F, a direct current internal resistance of 0.1Ω, and an equivalent series resistance of 0.07Ω. The step-down converter 42 is a DC/DC converter for lowering the voltage from 9 V to 1 V.

The rated voltage of the electric double layer capacitors 34 is significantly lower than the rated voltage (100 V in the conventional example) of an aluminum electrolytic capacitor. Increasing the withstand voltage by increasing the number of electric double layer capacitors 34 connected in series runs counter to the size reduction purpose, and therefore the number of the electric double layer capacitors is preferably as small as possible. Accordingly, the voltage supplied to the power supply cable 47 is set lower than in the conventional counterpart. As a result, the voltage applied to the solenoid 9 is lowered, and the value of current flowing through the solenoid 9 is also lowered. However, it is necessary for the solenoid 9 to generate a predetermined magnetomotive force in order for it to exert a predetermined attraction force. A magnetomotive force is determined by the product of the value of current passing though a coil and the number of turns in the coil. Increasing the number of turns in the coil is not preferable since it results in an increase in the size of the solenoid 9. For this reason, in order to increase the value of current flowing through the solenoid even at a low voltage (e.g., DC 12 V or less), the coil resistance is minimized. Therefore, in the example shown in FIG. 2, a solenoid that had the same size and weight and was made of the same material as the conventional counterpart, but had a reduced coil resistance of 0.3Ω (20° C.) was produced by increasing the diameter of the electric wire forming the coil, while reducing the number of turns from the conventional number of 315 to 80, This solenoid 9 exerted an attraction force of about 25 kgf at a current value of 20 A when the gap G was 0.4 mm, and exerted an attraction force of about 25 kgf at a current value of 1.6 A when the gap G was 0. Since such a low-resistance solenoid 9 was used, and electric double layer capacitors having a low internal resistance were used as the electric double layer capacitors 34, it was possible to supply a large current (18.3 A) that was sufficient for the initial actuation of the solenoid 9.

In the motive power supply 37, for example, for a solenoid valve of the normally closed type, when a valve opening operation signal is input from an external controller via the external signal input cable 48, the timing circuit 45 connects the switching circuit 44 to the first discharge line 40 to pass a initial starting current having a relatively large current value, thus opening the closed valve. After a certain time period (e.g., about 5 ms), the timing circuit 45 switches the switching circuit 44 to the second discharge line 41 to let a holding current with a relatively small current value flow in order to hold the open state of the valve. Since the holding current flowing through the second discharge line 41 has a relatively small current value, it is possible to prevent the solenoid from generating heat. When the valve opening operation signal ceases, the timing circuit 45 switches the switching circuit 44 to a circuit breaking position.

The timing with which the timing circuit 45 switches from the first discharge line 40 to the second discharge line 41 can be adjusted, and is set such that the switch is made after a time sufficient for the movable iron core to be attracted to the solenoid coil of the solenoid after the beginning of application of an initial starting current for the solenoid. According to the present invention, the time period between the input of a valve opening operation signal or closing operation signal and completion of an opening or closing of the solenoid valve, that is, the opening or closing time period of the valve can be 10 msec (milliseconds) or less, preferably 5 ms or less. In such a case, the time period during which the timing circuit 45 switches the first discharge line 40 to the second discharge line 41 can be adjusted within the range of 10 ms or less.

Figure 3:
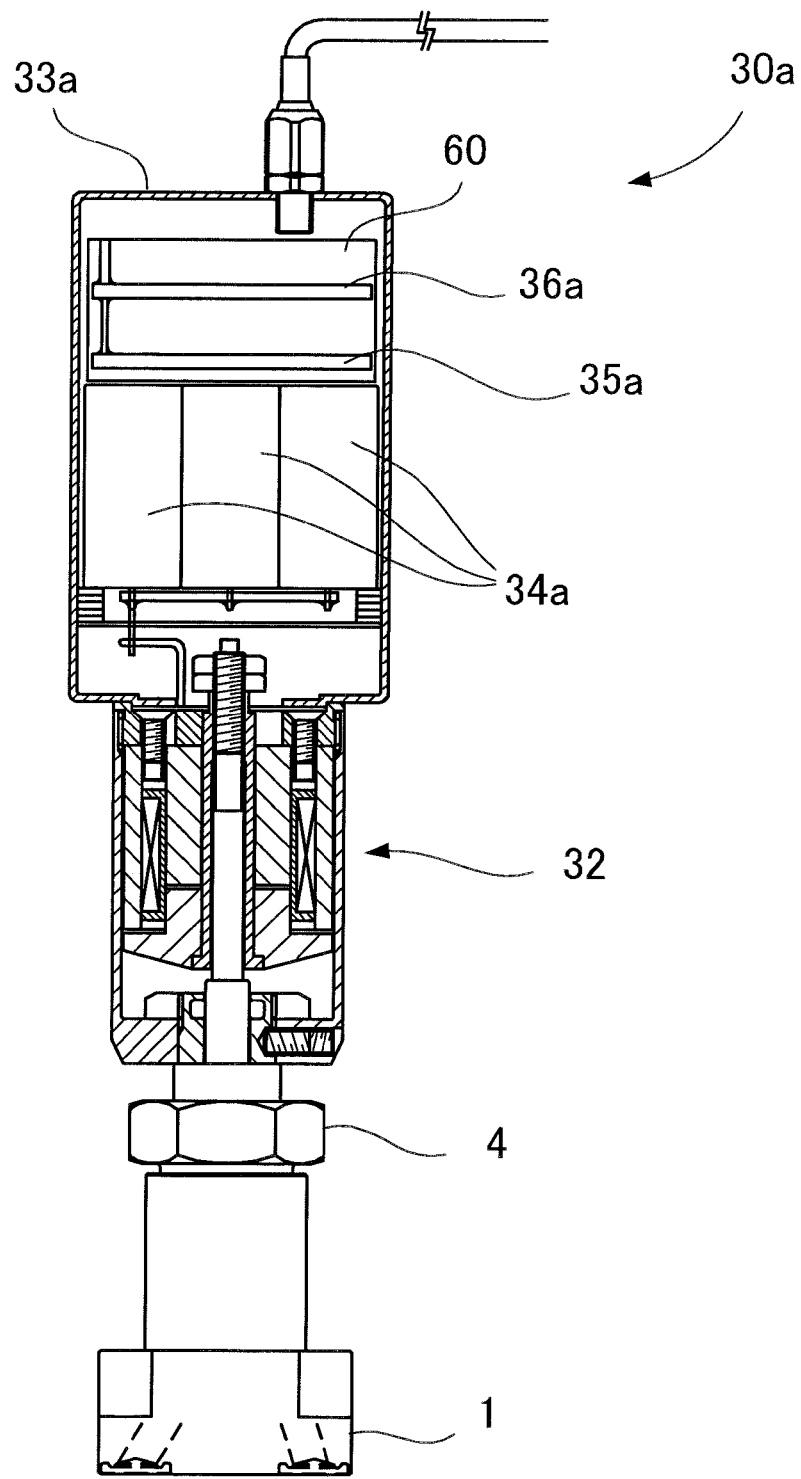
FIG. 3 is a longitudinal cross-sectional view showing a second embodiment of the solenoid valve according to the present invention.
Figure 4:
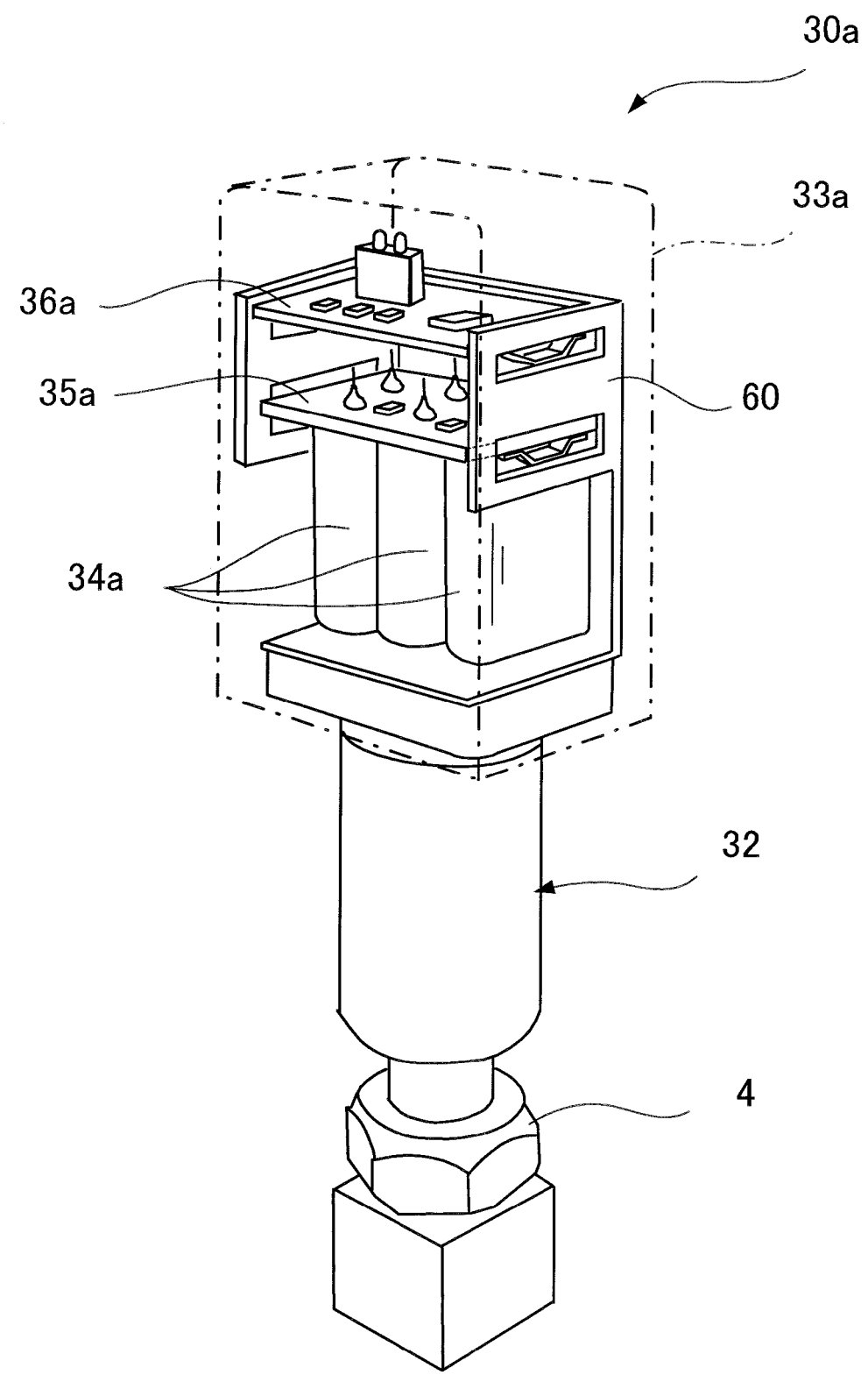
FIG. 4 is a perspective view of the solenoid valve in FIG. 3.

FIG. 3 is a longitudinal cross-sectional view showing the internal structure of a second embodiment of the solenoid valve according to the present invention, and FIG. 4 is a perspective view thereof.

In a solenoid valve 30a as shown in FIGS. 3 and 4, three electric double layer capacitors 34a are connected in series. The three electric double layer capacitors 34a are arranged such that they are stacked side by side. Electrode terminals (not shown) of the electric double layer capacitors 34a are soldered to a quadrangular first printed wiring board 35a.

the first printed wiring board 35a is supported by a supporting member 60 above the solenoid 32. Above the first printed wiring board 35a, that is, on the surface of the first printed wiring board 35a that is opposite the surface on which the electric double layer capacitors 34a are mounted, a second printed wiring board 36a is supported parallel to the first printed wiring board 35a by the supporting member 60. A plurality of electronic components constituting a control circuit (see numeral 39 in FIG. 2) that controls discharging of the charging power supply made up of the electric double layer capacitors 34a are mounted on the second printed wiring board 36a. The control circuit on the second printed wiring board 36a is connected to the electric double layer capacitors 34a via electric wiring.

In this way, using the supporting member 60, the first printed wiring board 35a and the second printed wiring board 36a are configured in a two-tiered support structure including a upper tier and a lower tier, thus forming a motive power supply 37a in one unit as a hybrid integrated circuit substrate in a three-dimensional configuration. The motive power supply 37a configured in this manner is housed in the casing 33a as a power source unit, and is attached to the solenoid 32 so as to be integrated with the valve body 31, forming a solenoid valve containing the motive power supply.

As is evident from the above description, a solenoid valve having the above-described configuration can realize space-saving by housing a motive power supply using electric double layer capacitors as a charging power supply in a casing provided integrally with a valve body.

Furthermore, the wiring can be shortened by housing the motive power supply in the casing, and therefore the wire resistance can be reduced.

Since the current flowing through the solenoid coil is increased by an amount by which the wire resistance is reduced, it is also possible to reduce the size of the solenoid coil itself, and the size of the solenoid valve as well can be reduced accordingly.

Figure 6:
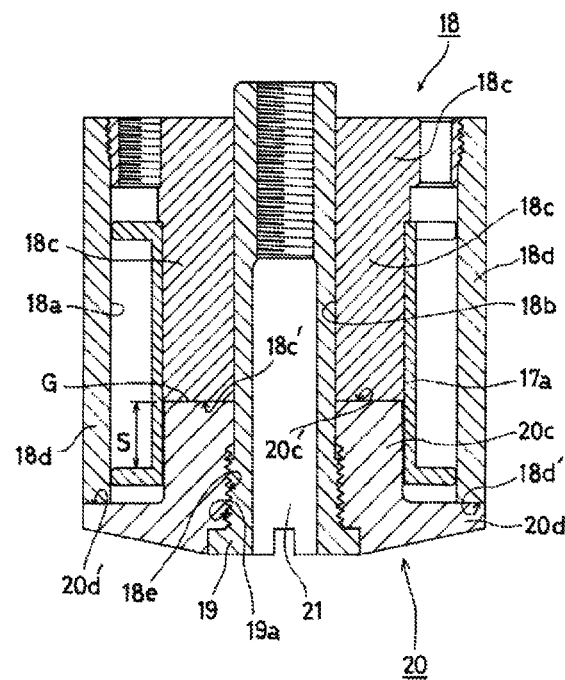
FIG. 6 is a cross-sectional view showing, in enlargement, the solenoid of the solenoid valve in FIG. 5.
Figure 7:
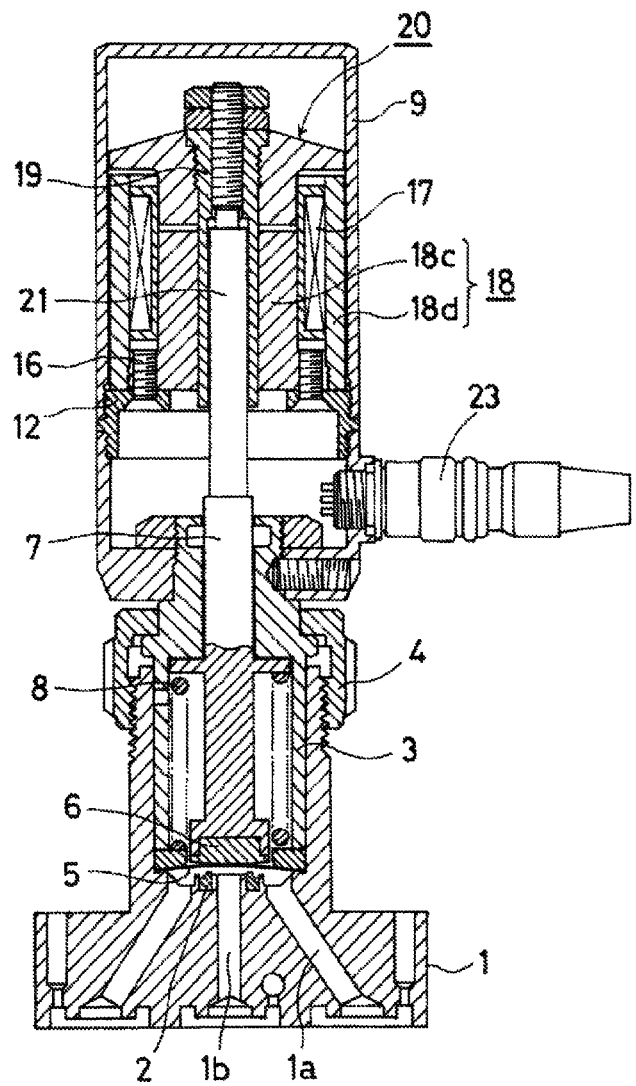
FIG. 7 is a central longitudinal cross-sectional view showing a conventional solenoid valve of normally open type.
Figure 8:
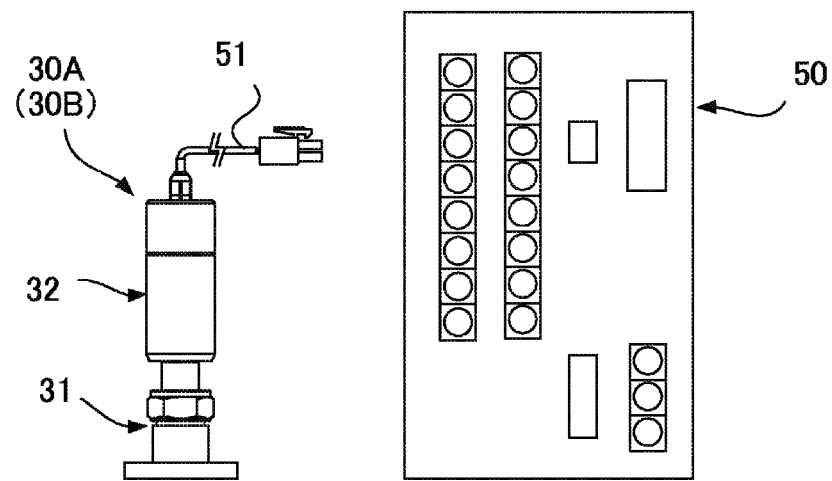
FIG. 8 is a front view showing the appearance of the solenoid valve in FIG. 5 and a dedicated external power source of the solenoid valve.
Figure 9:
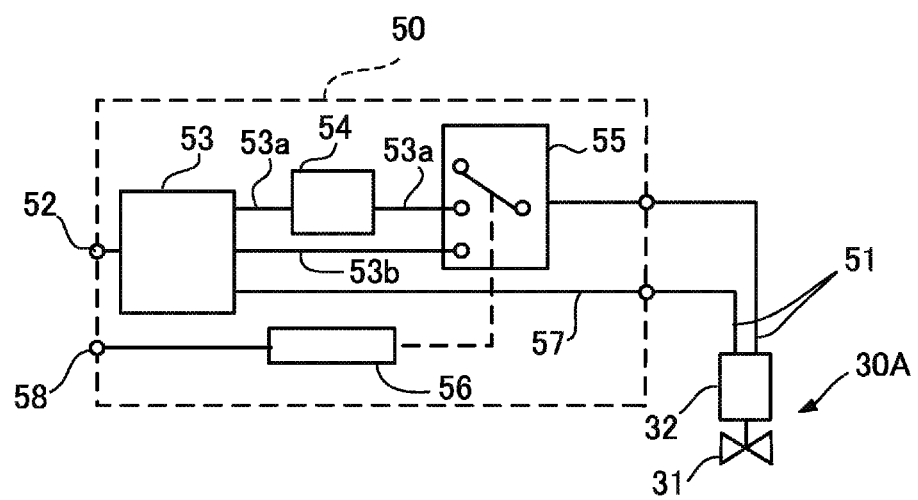
FIG. 9 is a block diagram showing the circuit configuration of the dedicated external power source in FIG. 8.
Figure 10:
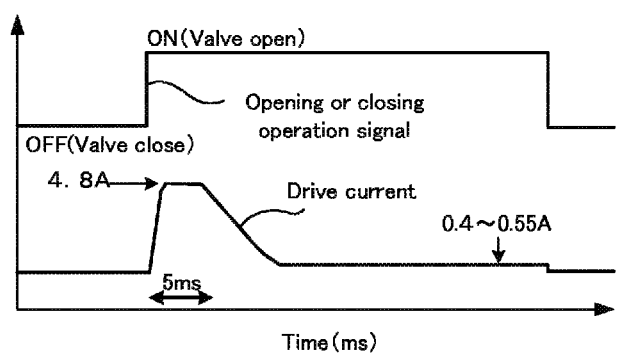
FIG. 10 is a timing diagram showing waveforms of an operation input signal and an output of an external dedicated power source including the circuit configuration in FIG. 9.

The present invention is not limited to the above-described embodiments, and modifications are possible without departing from the gist of the invention; the structures of the solenoid and the valve are not limited to the embodiments shown in FIGS. 5 to 7, and other embodiments may be adopted. For example, the valve or valve member is not limited to a diaphragm, and may be a needle valve. In the above embodiments, a case was described where the motive power supply was housed in the casing, but the solenoid valve according to the present invention may be mounted on the valve body or the solenoid with the motive power supply being exposed, without including a casing.

The invention claimed is:

1. A solenoid valve comprising:
a valve body including a flow passage, a valve member that opens and closes the flow passage, a valve seat on or from which the valve member can be seated or unseated, a stem that operates opening/closing of the valve member, and a spring that biases the stem;
a solenoid that is connected with the valve body and that actuates the stem;
a motive power supply that is a unit comprising a charging power supply for supplying a driving electric power to the solenoid with an electric double layer capacitor, and a control circuit, including a step-down converter, that controls the driving electric power supplied from the charging power supply to the solenoid in accordance with a command; and
a casing that is attached integrally to the valve body and that houses the motive power supply;
wherein the control circuit includes a first discharge line that is connected to the charging power supply to supply a starting current to the solenoid, a second discharge line that has the step down converter disposed therein and that is connected to the charging power supply to supply, to a solenoid coil, a holding current for holding a state in which a movable iron core is attracted, a switching circuit that switches between the first discharge line and the second discharge line to supply power to the solenoid, and a timing circuit that controls the timing of a switching operation of the switching circuit.

2. The solenoid valve according to claim 1, wherein the electric double layer capacitor has a low direct current internal resistance and a low equivalent series resistance.

3. The solenoid valve according to claim 1, wherein the electric double layer capacitor comprises a polarizable electrode formed of activated carbon obtained by using at least one of phenolic and furfural resins as a starting material.

4. The solenoid valve according to claim 3, wherein the polarizable electrode is formed of glassy carbon.

5. The solenoid valve according to claim 4, wherein the glassy carbon has a specific surface area of 1 to 500 $m^2/g$.

6. The solenoid valve according to claim 1, wherein the electric double layer capacitor having single-cell electrical properties including a rated voltage of 2.1 to 2.7 V, a capacitance of 1 to 5 F, a direct current internal resistance of 0.01 to 0.1$\Omega$, and an equivalent series resistance at 1 KHz of 0.03 to 0.09$\Omega$.

* * * * *